United States Patent [19]
Jafarkhani et al.

[11] Patent Number: 6,125,149
[45] Date of Patent: Sep. 26, 2000

[54] SUCCESSIVELY REFINABLE TRELLIS CODED QUANTIZATION

[75] Inventors: Hamid Jafarkhani, Middletown; Vahid Tarokh, Madison, both of N.J.

[73] Assignee: AT&T Corp., New York, N.Y.

[21] Appl. No.: 09/072,782

[22] Filed: May 6, 1998

Related U.S. Application Data

[60] Provisional application No. 60/064,311, Nov. 5, 1997.

[51] Int. Cl.[7] .................................................. H04L 23/02
[52] U.S. Cl. ...................... 375/262; 375/265; 375/341; 714/792; 714/794; 714/795
[58] Field of Search ................... 375/341, 262, 375/265; 714/792, 794, 795

[56] References Cited

U.S. PATENT DOCUMENTS

| | | | |
|---|---|---|---|
| 5,162,812 | 11/1992 | Aman et al. | 375/34 |
| 5,185,747 | 2/1993 | Farahati | 371/43 |
| 5,586,128 | 12/1996 | Chen | 371/43 |
| 5,812,602 | 9/1998 | Hamblet | 375/265 |

OTHER PUBLICATIONS

H. A. Aksu and M. Salehi, "Multi–Stage Trellis Coded Quantization (MSTCQ)," *Proc. Conf. Inform. Sciences & Systems*, Baltimore, Maryland, Mar. 1995.

M. W. Marcellin and T. R. Rischer, "Trellis Coded Quantization of Memoryless and Gauss–Markov Sources," *IEEE Trans. on Communications*, vol. 38, No. 1, Jan. 1990, pp. 82–93.

P. J. Sementilli et al., "Progressive Transmission in Trellis Coded Quantization–Based Image Coders," *Conf. Image Processing*, Santa Barbara, California, Oct. 1997.

H. Jafarkhani et al., "Entropy–Constrained Successively Refinable Scalar Quantization," *Proc. IEEE Data Compression Conference*, Mar. 1997, pp. 337–346.

V. A. Vaishampayan, "Design of Multiple Description Scalar Quantizers," *IEEE Trans. on Information Theory*, vol. 39, No. 3, May 1993; pp. 821–834.

V. A. Vaishampayan and J. Domaszewicz, "Design of Entropy–Constrained Multiple–Description Scalar Quantizers," *IEEE Trans. on Information Theory*, vol. 40, No. 1, Jan. 1994, pp. 245–250.

*Primary Examiner*—Stephen Chin
*Assistant Examiner*—Dac V. Ha

[57] ABSTRACT

A trellis quantizer that produces an output sequence adapted for successively refinable decoded approximation employs a multi-level trellis graph. At any given level a next refinement level is obtained by replacing each transition of the trellis graph at the given level with a trellis graph. The codevectors of the refined trellis quantizer can be optimized for all levels of refinements by an iterative process that assesses the distortions resulting from modifying the codevectors. The optimizing is carried out concurrently for all levels of refinement, achieving thereby a quantizer that is optimized for whatever level of refinement the quantizer is asked to carry out. This optimization takes into account the probability distribution of incoming signal levels.

24 Claims, 4 Drawing Sheets

SUCCESSIVELY REFINABLE TRELLIS CODED QUANTIZATION

REFERENCE TO RELATED APPLICATIONS

This application claims the benefit of U.S. Provisional Application No. 60/064,311, filed Nov. 5, 1997. This application is also related to an application filed on even date herewith, which carries the Ser. No. 09/072,782, and is titled "Multiple Description Trellis Coded Quantization".

BACKGROUND OF THE INVENTION

This invention relates to coding and, more particularly, to trellis coding.

In recent years, successively refinable or rate-scalable source coders have received growing attention. By selecting different sub-streams of the output of such coders, various levels of encoding rate and distortion can be achieved.

One immediate application of rate-scalability is in progressive transmission. Sometimes the utility of progressive transmission is readily apparent because it is central to an application. One important example is in telemedicine, where a specialist must sort through and retrieve a large number of medical images over a network. If the images can be transmitted progressively so that unneeded images, or sections of images, can be identified before they have been transmitted with high fidelity, then cost and bandwidth can be saved. A similar application is the transmission of maps in which a low-resolution map of a big area can be transmitted first. The user can identify a specific area in the received map and request a high-resolution map of the specified region.

Another application of an embedded bit stream is in the transmission of video over an asynchronous transfer mode (ATM) network where some ATM cells may be lost in transit through the network. A video coder with an embedded output bit stream can mark the ATM cells with an importance measure; as a video frame is coded progressively, the descriptions become successively less important since they contribute less to the reduction of distortion. Cells in the network can then be dropped preferentially based upon their importance in distortion reduction.

Also, when multicasting over heterogeneous networks, rate-scalability provides the opportunity of using one bit stream for all receivers and intelligently dropping the less important portions of the bit stream for users with less available bandwidth.

Additionally, in many practical applications where the signal is transmitted over a noisy channel, the rates of the source and channel codes must be adjusted according to the level of noise in the channel. If the channel is a time-varying channel, as it is in many wireless communication situations, it is prudent to adaptively vary the rate allocation between the source and channel coding operations. Successive refinability allows the possibility of adapting the rate of the source encoder in a straightforward manner. Of course, similar rate-scalability features are needed for the channel coding part.

A powerfull source coding scheme for memoryless sources is trellis coded quantization (TCQ). See M. W. Marcellin and T. R. Fischer, "Trellis coded quantization of memoryless and Gauss-Markov sources," *IEEE Trans. Comm.*, Vol. 38, January 1990, pp. 82–93. It has been shown that for a memoryless uniform source, trellis coded quantizers provide mean squared errors (MSEs) within 0.21 dB of the theoretical distortion bounds (for given rates). The performance of a TCQ is much better than that of the best scalar quantizer (Lloyd-Max quantizer) at the same rate.

Until now, it has been thought that trellis coding does not lend itself to successive refinability. In "Multi-state trellis coded quantization (MS-CW)", reported by H. A. Aksu and M. Salehi, in *Proc. Conf. Inform. Sciences and Systems*, Baltimore, Md., March 1995, the idea of multi-stage quantization is combined with that of TCQ. Therein, each stage of TCQ quantizes the error between the original and the quantized output of the previous stage. Unfortunately, multi-stage TCQ (MS-TCQ) suffers from about 2 dB performance degradation compared to the performance of TCQ. In "Progressive transmission in trellis coded quantization-based image coders," P. J. Sementilli et al, reported in *Conf. Image Processing*, Santa Barbara, Calif., October 1997, the TCQ structure is preserved and trellis coding is applied, but only to the last stage. Using a successive approximation-type setting, the inverse TCQ operation is performed only approximately for all intermediate stages. The resulting quantization scheme has been utilized for progressive transmission of images, but it doesn't take full advantage of the trellis structure.

SUMMARY

An improvement in the art is realized with a successively refinable trellis quantizer. A trellis quantizer at a given level of refinement is refined to a next refinement level by replacing each transition of the trellis graph at the given level with a trellis graph. The codevectors of the refined trellis quantizer can be optimized for all levels of refinements by an iterative process that assesses the distortions resulting from modifying the codevectors. The optimizing is carried out concurrently for all levels of refinement, achieving thereby a quantizer that is optimized for whatever level of refinement the quantizer is asked to carry out. This optimization takes into account the probability distribution of incoming signal levels.

DETAILED DESCRIPTION

Figure 1:
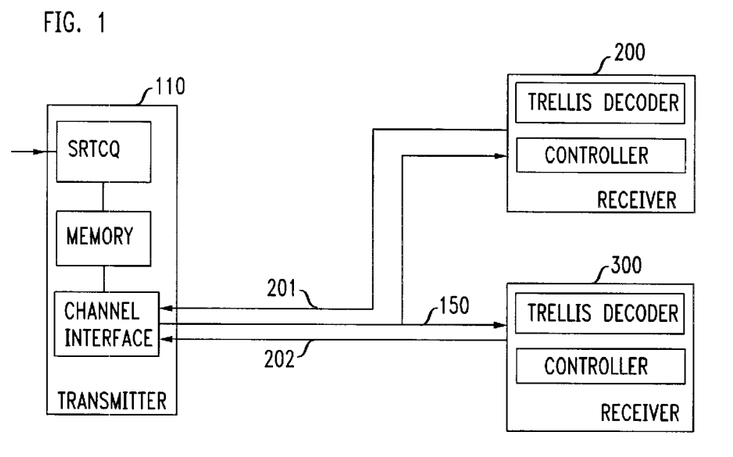
FIG. 1 presents an arrangement that can benefit from a successively refinable coding arrangement.

FIG. 1 presents an arrangement that can benefit from successively refinable coding. Block 110 corresponds to a transmitter that encodes an incoming signal and outputs a robust code that is transmitted, via connection channel 150, to receivers 200 and 300. Receiver 200 is adapted to receive, respond to, and benefit from the full store of information that is contained in the code sent by block 110. By contrast, receiver 300 is adapted to respond to, and benefit from, only a subset of the information contained in the code sent by block 110. Illustratively, block 110 might be an encoder/transmitter for a high definition TV (HDTV) signal in a system where there is a requirement that non-HDTV sets must be able to view the same programming. Alternatively, in a different embodiment, block 110 may be an encoder that can be adjusted to develop a code at a specified level of refinement, and receivers 200 and 300 are coupled to block 110 (probably not simultaneously) to request information at a specified level of refinement. The specification of a particular level of coding granularity is delivered to block 110 via channels 201 and 202 and may depend, for example, on the characteristics of channel 150. Channels 201 and 202 are not needed, of course, in the first embodiment mentioned above. In still another embodiment block 110 sends the encoded information in different sub-channels of channel 150, to allow receivers 200 and 300 to choose, independently, the level of granularity that they are able to handle.

Figure 2:
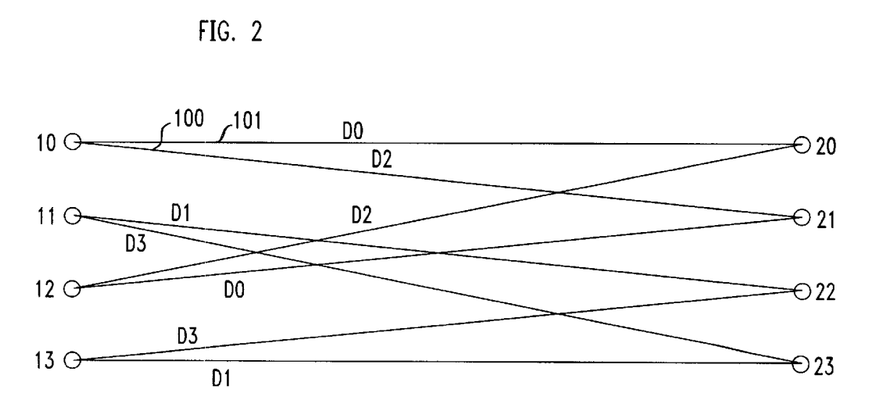
FIG. 2 shows a one-bit trellis coding graph.

To better understand the principles disclosed herein, it is helpful to review how trellis coding is achieved. FIG. 2 presents a prior art four-state trellis graph that may be used to encode an incoming signal. Circles 10–13 designate four possible states of a coding stage, and circles 21–23 designate the immediately subsequent four possible states of the coding stage, i.e., after one transition. The four-state graph of FIG. 2 provides a template for encoding an incoming signal that comprises a sequence of values, e.g., quantized voltage samples, into a sequence of bits, based on quantization levels $c_0$, $c_1$, $c_2$, and $c_3$, which are associated with transitions D0, D1, D2, or D3, respectively. In trellis coding, the encoding is carried out on frames of the incoming signal. That is, the coded sequence for the frame is not selected until the entire frame has been processed. This approach allows the encoding process to minimize the overall, average, quantization error, which may be expressed by $$\frac{1}{L}\sum_{i=1}^{L} p(x_i)|x_i - \tilde{x}_i|^2, \quad (1)$$

where L is the number of samples that are encoded, $(x_i - \tilde{x}_i)^2$ is the magnitude of the difference between the $i^{th}$ signal sample and its corresponding quantized (decoded) level, squared, and $p(x_i)$ is the probability of signal sample $x_i$. Equation (1) provides a measure of the distortion experienced, but it should be realized that other distortion measures may be used. The following specific example, which illustrates the encoding process, might be helpful in understanding the coding process using TCQ.

Assume that the quantization levels of $c_0$, $c_1$, $c_2$, and $c_3$ were selected to correspond to levels –10, –3, +2, and +12, respectively. That is, state 10 in FIG. 2 resolves between levels –10 and +2, and selects either transition D0 or D2. Similarly, state 11 resolves between levels –3 and +12, and selects either transition D1 or D3. Likewise, state 12 resolves between levels +2, and –10 and selects either transition D2 or D0. Lastly, state 13 resolves between levels +12, and –3 and selects either transition D3 or D1. Assume also that the signal frame to be encoded comprises the sequence {+4, +8, 0, –4, +3, –7, –5}.

The encoding process employs the FIG. 2 trellis as a template for each one of the input samples, with states 20–23 of one template merging into states 10–13 of the next template. The table below shows the calculations that the TCQ performs on the frame before reaching a decision regarding the sequence of quantizer levels that would best represent the incoming signal frame.

TABLE 1

| TCQ state | 13 | | 12 | | 11 | | 10 | |
|---|---|---|---|---|---|---|---|---|
| Quanitizer levels | –3 (D1) | +12 (D3) | –10 (D0) | +2 (D2) | +12 (D3) | –3 (D1) | +2 (D2) | –10 (D0) |
| Cum. costs | | | | | | | | 0 |
| +4 sample costs | | | | | | | $2^2$ | $14^2$ |
| Cum. costs | | | | | | 4 | | 196 |
| +8 sample costs | | | | | $4^2$ | $11^2$ | $6^2$ | $18^2$ |
| Cum. costs | | 20 | | 125 | | 232 | | 520 |
| 0 sample costs | $3^2$ | $12^2$ | $10^2$ | $2^2$ | $12^2$ | $3^2$ | $2^2$ | $10^2$ |
| Cum. costs | 29 | 376 | 164 | 241 | 125 | 524 | 129 | 620 |
| –4 sample costs | $1^2$ | $16^2$ | $6^2$ | $6^2$ | $16^2$ | $1^2$ | $6^2$ | $6^2$ |
| Cum. costs | 30 | 481 | 285 | 226 | 200 | 165 | 200 | 165 |
| +3 sample costs | $6^2$ | $9^2$ | $13^2$ | $1^2$ | $9^2$ | $6^2$ | $1^2$ | $13^2$ |
| Cum. costs | 66 | 246 | 111 | 201 | 395 | 166 | 227 | 334 |
| –7 sample costs | $4^2$ | $19^2$ | $3^2$ | $9^2$ | $19^2$ | $4^2$ | $9^2$ | $3^2$ |
| Cum. costs | 82 | 527 | 427 | 182 | 120 | 308 | 192 | 236 |
| –5 sample costs | $2^2$ | $17^2$ | $5^2$ | $7^2$ | $17^2$ | $2^2$ | $7^2$ | $5^2$ |
| Cum. costs | 86 | 409 | 371 | 124 | 207 | 231 | 261 | 217 |

Each cumulative sum cell in the above table contains two cost values that are derived from the FIG. 2 graph. The lower cost value is selected for the next calculation step, and is shaded in the above table for the reader's convenience. Illustratively, the pattern of calculations which responds to the input sample that has the value 0 proceeds as follows:

- the 620 value derives from adding the 520 cumulative cost to the $10^2$ cost that accrues from assuming that quantizer level –10 would be used;
- the 129 value derives from adding the 125 cumulative cost to the $2^2$ cost that accrues from assuming that quantizer level +2 would be used;
- the 524 value derives from adding the 520 cumulative cost to the $2^2$ cost that accrues from assuming that quantizer level +2 would be used;
- the 225 value derives from adding the 125 cumulative cost to the $10^2$ cost that accrues from assuming that quantizer level –10 would be used;
- the 241 value derives from adding the 232 cumulative cost to the $3^2$ cost that accrues from assuming that quantizer level –3 would be used;
- the 164 value derives from adding the 20 cumulative cost to the $12^2$ cost that accrues from assuming that quantizer level +12 would be used;
- the 376 value derives from adding the 232 cumulative cost to the $12^2$ cost that accrues from assuming that quantizer level +12 would be used; and
- the 29 value derives from adding the 20 cumulative cost to the $3^2$ cost that accrues from assuming that quantizer level –3 would be used.

The lowest costs at this point in the calculations are 129, 225, 164, and 29.

Carrying out the cost calculations to the end of the frame, it turns out that the lowest frame error cost of the illustrative example is 86. This cost is reached when the path followed corresponds to the sequence of shaded cells shown in Table 2.

TABLE 2

| Quanitizer levels | -3 | +12 | -10 | +2 | +12 | -3 | +2 | -10 |
|---|---|---|---|---|---|---|---|---|
| Cum. costs | | | | | | | | 0 |
| +4 sample costs | | | | | | $2^2$ | $14^2$ | |
| Cum. costs | | | | | 4 | | $196$ | |
| +8 sample costs | | | | | $4^2$ | $11^2$ | $6^2$ | $18^2$ |
| Cum. costs | | 20 | | 125 | | | | 520 |
| 0 sample costs | $4^2$ | $12^2$ | $10^2$ | $2^2$ | $12^2$ | $3^2$ | $2^2$ | $10^2$ |
| Cum. costs | 29 | 376 | 164 | 241 | 225 | 524 | 129 | 620 |
| -4 sample costs | $12^2$ | $16^2$ | $6^2$ | $6^2$ | $16^2$ | $1^2$ | $6^2$ | $6^2$ |
| Cum. costs | 30 | 481 | 285 | 226 | 200 | 165 | 200 | 165 |
| +3 sample costs | $6^2$ | $9^2$ | $13^2$ | $1^2$ | $9^2$ | $6^2$ | $1^2$ | $13^2$ |
| Cum. costs | 66 | 246 | 111 | 201 | 395 | 166 | 227 | 334 |
| -7 sample costs | $4^2$ | $19^2$ | $3^2$ | $9^2$ | $19^2$ | $4^2$ | $9^2$ | $3^2$ |
| Cum. costs | 82 | 527 | 427 | 182 | 120 | 308 | 192 | 236 |
| -5 sample costs | $2^2$ | $17^2$ | $5^2$ | $7^2$ | $17^2$ | $2^2$ | $7^2$ | $5^2$ |
| Cum. costs | 86 | 409 | 371 | 124 | 207 | 241 | 261 | 217 |

This path results from selecting transitions D2, D3, D1, D1, D1, D1 of the FIG. 2 trellis graph, which effectively corresponds to selecting quantizer levels +2, +12, −3, −3, −3, −3, and −3 at the encoder.

On the decoder side, a codebook of quantized levels $e_i$ is used to decode the received bits and convert them to sample levels. This set corresponds to the set of quantized levels employed in the encoder, $c_i$, and typically $e_i$ is chosen to equal $c_i$. However, whatever codebook of quantized levels is used, it is fairly obvious that a decoded signal which corresponds to the encoded data would not be an exceptionally good representation for the incoming signal sequence {+4, +8, 0, −4, +3, −7, −5}. For example a decoded sequence of {+2, +12, −3, −3, −3, −3, −3} is certainly not close to the input sequence. Still, it is the best representation within the constraints of the trellis code schema selected.

Figure 3:
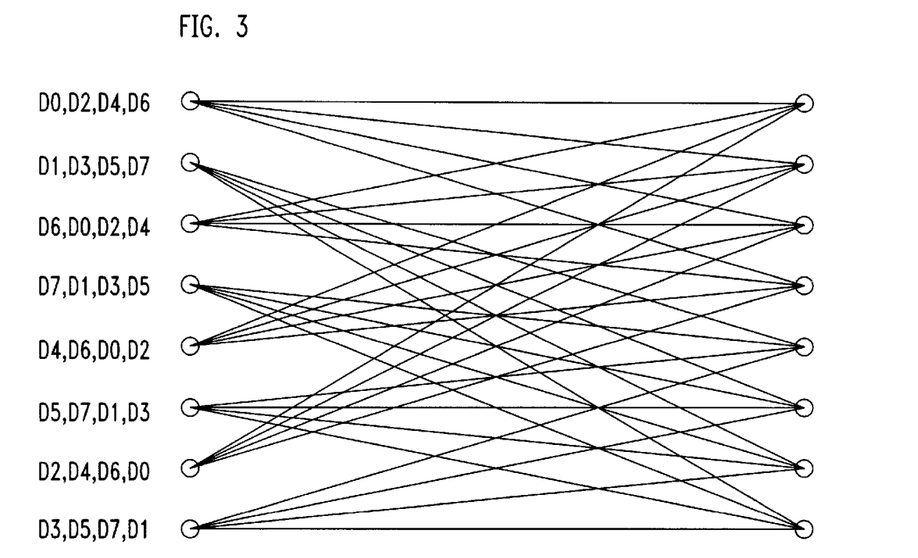
FIG. 3 depicts a two-bit trellis coding graph.

One characteristic of the schema selected is that at any one point a single bit of the quantized signal dictates the state that can be reached, and the single bit can only resolve one out of two states. If two bits were used, then four states could be resolved from any one state, and a decoded signal would more likely be close to the encoded incoming signal sequence. FIG. 3 presents an illustrative trellis graph for an arrangement employing two bits for encoding each sample.

The objective of this invention is to create an arrangement that includes the benefits of TCQ even when some of the data might be missing at the receiver, might not be employed by the receiver, or might be sent to the receiver to successively refine the decoded signal. For example, one objective is to create an encoded signal sequence that can be used by one user, while another user employs only a subset of the sequence. Another objective is to create a signal sequence but to send only a portion thereof: the remainder of the sequence would be sent only if the receiver requested it.

Until now, it has been thought that trellis coding does not provide such successive approximation capabilities because each state of a decoder in the decoding process, like the state of the encoder in the encoding process, depends on the previous states. Missing a piece of data is likely to completely destroy the integrity of subsequently decoded signals.

Figure 4:
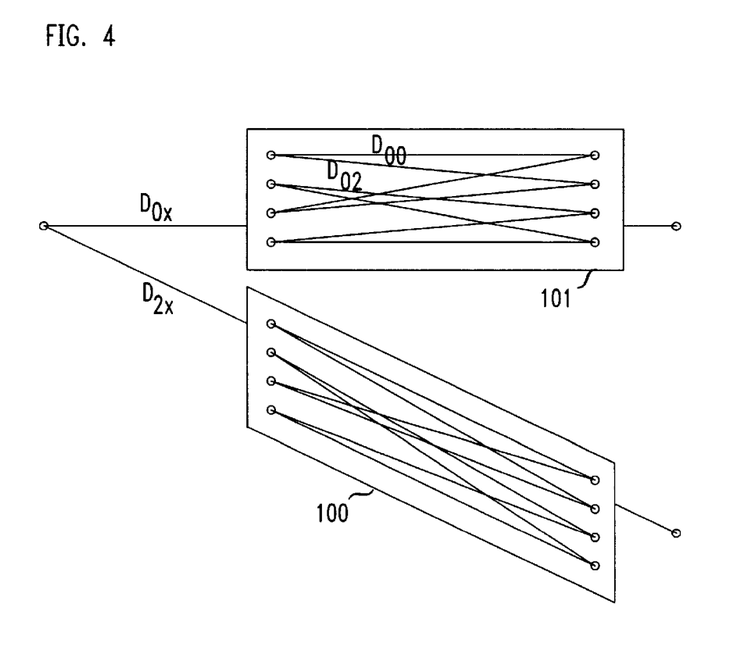
FIG. 4 illustrates how a refinement is effected in the FIG. 1 trellis coding graph.
Figure 5:
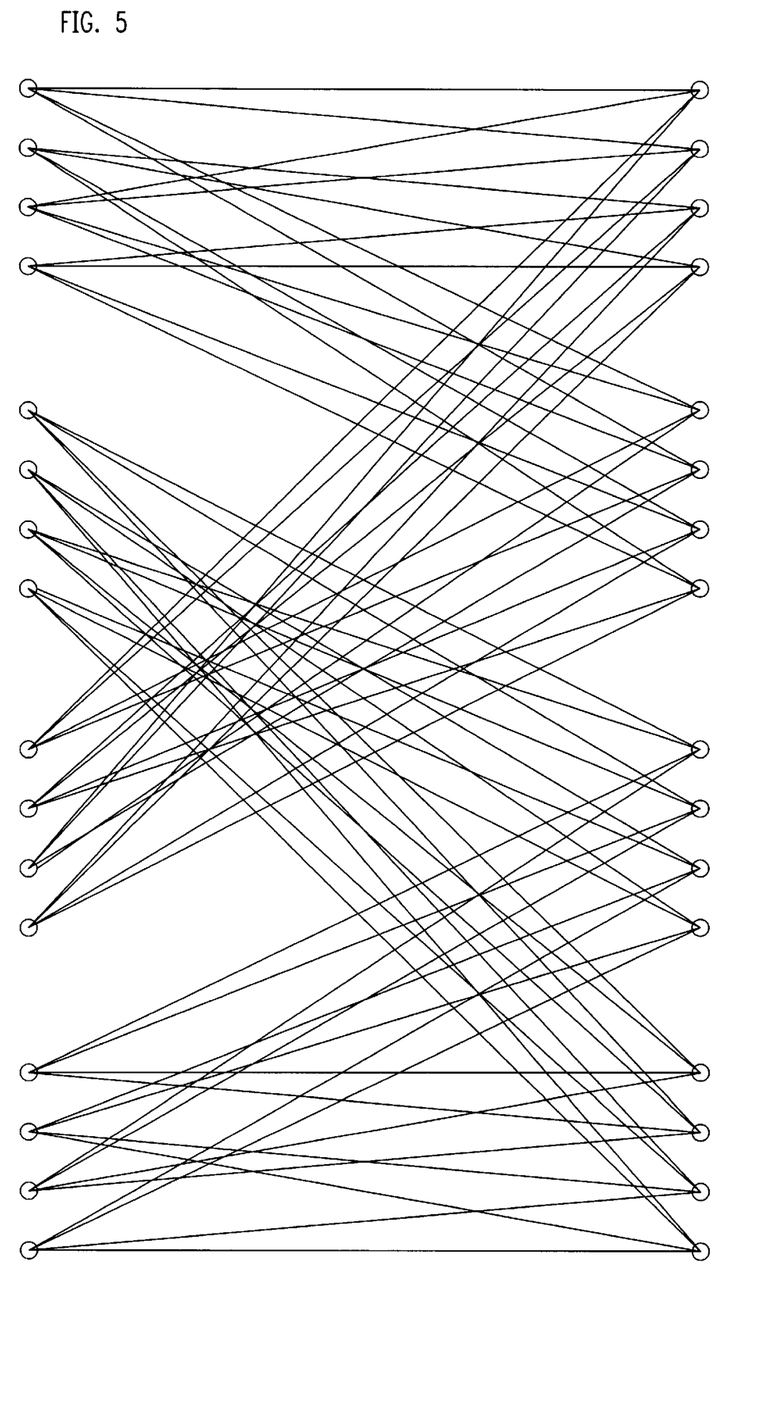
FIG. 5 presents the entire FIG. 1 trellis coding graph with a refinement with an identical graph.

This problem is overcome, in accordance with the principles disclosed herein by successively replacing each transition in a trellis graph with another trellis graph, and such substitutions can be repeated as many times as desired. This is illustrated in FIG. 4, which shows the D0 and D2 transitions of the FIG. 2 graph (transitions 101 and 100, respectively) replaced with FIG. 2 trellis graphs. Consequently, a sample is represented by one bit that effectively selects either the D0 or the D2 path, and by a second bit that selects a path through the second trellis graph. A full representation of the FIG. 2 graph, refined, or expanded by replacing each of the transitions with a trellis graph, is shown in FIG. 5. Note that there are now 16 output states of the resulting trellis graph.

FIG. 5 illustrates a first level of successive refinement, but it should be understood that further successive refinements are directly extendible from FIG. 5 in an identical manner.

The remaining question is how to define the quantization levels for the different transitions of the successively refinable trellis quantizer (the −10, −3, +2, and +12 levels in the above example). In our approach, these levels, which make up the codebooks of the different levels in the successive refinement, are designed together based on a training sequence that has the same probability distribution as the expected actual signal. This is in contrast to an approach where the codebook for each refinement stage is designed independently. These are also the levels assigned by the decoder.

The basic procedure is iterative, where an appropriate encoder design is fixed, and a best decoder is derived. The derived decoder is then fixed, and a best encoder is derived for that decoder. This completes one iteration, which is repeated until the improvement in the distortion falls below a preselected threshold.

More specifically, the average distortion for a trellis code can be expressed by $$D = \frac{1}{L}\sum_n |x(n) - \tilde{x}(n)|^2 \qquad (2)$$

where x(n) is a sample in a training sequence of length L, and $\tilde{x}(n)$ is a corresponding decoded approximation of $c_i^j$. The average distortion for an arrangement where each successive refinement represents another level, j, is $$D = \frac{1}{L}\sum_{j=1}^{J} p(j) \sum_{n=1}^{L} |x(n) - \tilde{x}_j(n)|^2 \qquad (3)$$

where p(j) is the probability distribution of using a particular level of refinement, and J is the maximum number of refinement levels. That is, for a given set of codebooks, when the distortion measure of equation (3) is minimized, one obtains the best outputs at different levels of refinement.

If $B_i^j$ is defined as the set of all training samples which are encoded as $c_i^j$, where the superscripts j designates a level, and the subscript i designates the different quantization levels in the $j^{th}$ level, and $|B_i^j|$ corresponds to the number of samples in $B_i^j$, then when $c_i^j$ is replaced with $\tilde{c}_i^j$ defined by $$\tilde{c}_i^j = \frac{1}{|B_i^j|} \sum_{x(n) \in B_i^j} x(n), \quad (4)$$

the resulting set of codebooks provides a lower distortion. It may be noted that $x(n) \in B_i^j$ does not necessarily mean that $c_i^j$ is the closest quantization level to $x(n)$.

Figure 6:
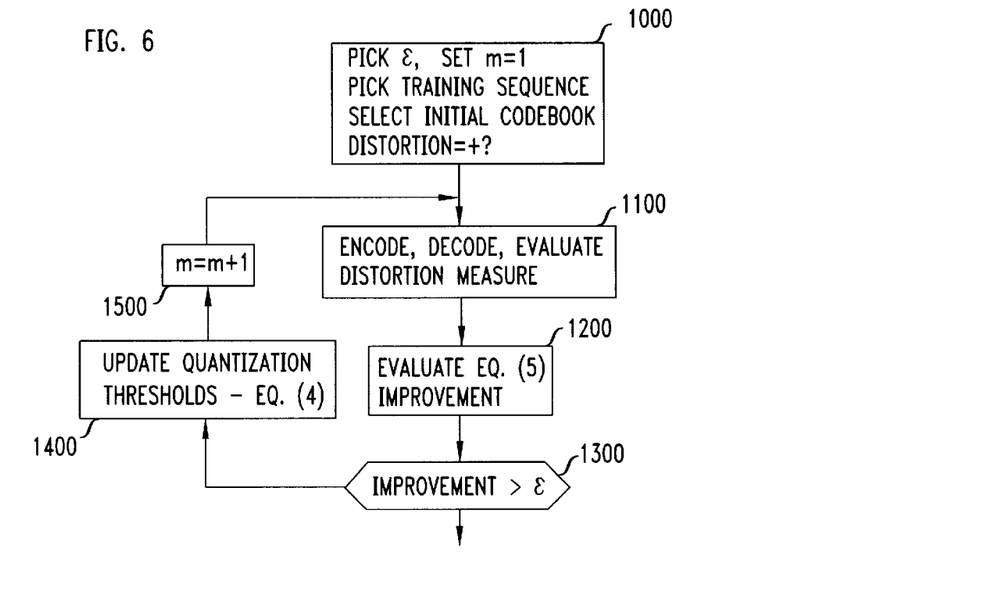
FIG. 6 shows a flow chart of the codevectors generation process.

FIG. 6 presents a flow diagram of the design approach. Block 1000 initializes the process by picking a small positive number as the threshold $\epsilon$, picking an initial set of codevectors, setting index m=1 and setting the $0^{th}$ iteration distortion value $\overline{D}^{(0)} = +\infty$.

Figure 7:
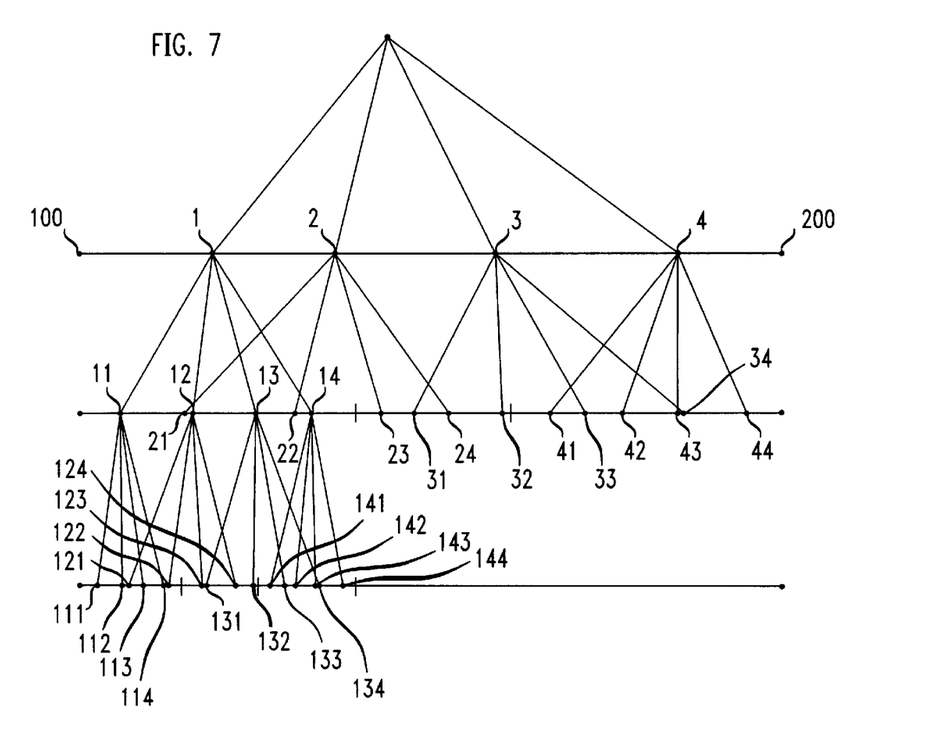
FIG. 7 illustrates a set of code vectors for successively refinable trellis quantizer.

An initial set of codevectors is presented in FIG. 7. In constructing this initial set, a number of items need to be noted, First, the span of inputs (signal span) is defined by the span between points 100 and 200. In selecting the codebook for the first level of refinement, where the four quantizer levels 1, 2, 3, and 4 are selected, these quantizer levels do not need to divide the signal span absolutely equally. The probabilities of the input signal can be considered. However, since the selected quantizer levels are likely to be altered by the FIG. 6 process, quantizer levels 1, 2, 3, and 4 could be selected to divide the signal span equally (although, to maintain generality, the FIG. 6 division is not equal). Second, in selecting the quantizer levels for a subsequent refinement, the expansion of each node (quantizer level) in one refinement level to a set of quantizer levels for the successive refinement level must select quantizer levels such that they would cover the proper signal span. For example, in choosing quantizer levels 11, 12, 13, and 14, one should be cognizant of the fact that if quantizer level 1 was reached, it means that quantizer level 3 could have been reached—but was not reached because of the signal's value. One should also be cognizant that quantizer levels 2 and 4 were not in the running at all. Consequently, quantizer levels 11, 12, 13, 14, 31, 32, 33, and 34 should be selected to span the entire signal range (from point 100 to point 200), ignoring the contribution from quantization levels 2 and 4. Likewise, quantizer levels 21, 22, 23, 24, 41, 42, 43, and 44 should be selected to span the entire signal range, ignoring the contribution from quantization levels 1 and 3. Third, there is no requirement that all of the quantizer levels need to be distinct. For example, quantizer levels 21 and 22 could have been selected to equal each other. FIG. 7 shows the first and second refinement levels, and a quarter of the third refinement level.

Having selected a set of codebooks, control passes to block 1100 which encodes a training sequence, using the algorithm described above. Block 1100 then obtains a distortion measure by first decoding the encoded bits produced by block 1100 to obtain a sequence of samples that approximates the training sequence and by comparing the training sequence to the decoded approximation thereto according to equation (2), denoting it as $\overline{D}^{(m)}$. Block 1100 also ascertains the set of $B_i^j$'s. Control then passes to block 1200 where the distortion improvement measure $$\frac{\overline{D}^{(m-1)} - \overline{D}^{(m)}}{\overline{D}^{(m)}} \quad (5)$$

is evaluated. Thereafter, control passes to decision block 1300 where the distortion improvement measure is compared to $\epsilon$. When the distortion improvement measure exceeds $\epsilon$, control passes to block 1400 where the quantization levels are updated using equation (4). The calculation of equation (4) is repeated for each distinct quantizer level of each level of refinement. From block 1400, the process continues to block 1500 where the index m is incremented and control is passed to block 1100.

The above disclosed the principles of this invention, but it should be realized that various features were disclosed merely for illustrative purposes, and that other embodiments are possible, with different embedded features. For example, FIG. 5 illustrates how a trellis quantizer having a trellis graph of FIG. 2 can be refined by replacing each transition in the FIG. 2 graph with a FIG. 2 graph. It should be realized, however, that another trellis graph can be employed to replace the FIG. 2 graph transitions, and that the two graphs don't have to employ the same number of bits.

The above disclosure illustrates the principles of this invention through illustrative embodiments of this invention, and various modifications and enhancements can be introduced by artisans without departing from the spirit and scope of this invention, which is defined by the following claims. For example, the FIG. 2 trellis that forms the "basic building-block" of the trellises employed herein can be replaced with other trellises, and the trellises of the various refinements do not have to be the same as the trellis of the first (primary) encoded representation of the input sequence, or the same as each other. Also, although the above addresses trellis coded quantization (TCQ) using scalar levels, that can be generalized to vectors (TCVQ), to entropy-coded TCQ, and to entropy-coded TCVQ. The generalized class that includes TCQ, TCVQ, entropy-coded TCQ, and entropy-coded TCVQ is termed herein GTCQ.

We claim:

1. Apparatus comprising:
   a receiver for receiving a GTCQ-encoded signal, and
   a trellis-code-quantization decoder, responsive to said receiver, for developing a frame of signal samples that form
   a) a first approximation of input signal samples represented by said GTCQ-encoded signal when said received GTCQ-encoded signal has a first plurality of bits, or
   b) a second approximation of said input signal samples represented by said GTCQ-encoded signal when said received GTCQ-encoded signal has a second plurality of bits, where said second approximation more faithfully approximates said input signal samples than said first approximation when the number of bits in said second plurality is greater than the number of bits in said first plurality.

2. Apparatus comprising:
   a receiver for receiving a first plurality of bits of a GTCQ-encoded signal, or a second plurality of bits of a GTCQ-encoded signal, where said first plurality of bits includes said second plurality of bits and additional bits; and
   a trellis-code-quantization decoder, responsive to said input signal, for developing an output signal which approximates a source signal, regardless of whether said receiver receives said first plurality of bits or said second plurality of bits, where said output signal more faithfully approximates said source sinal when said receiver receives said first plurality of bits.

3. The apparatus of claim 2 where said receiver receives said first plurality of bits, and includes a selector for applying said first plurality of bits or said second plurality of bits to said decoder.

4. The apparatus of claim 3 where said receiver receives said second plurality of bits, and in response to said selector, said receiver receives said additional bits.

5. The apparatus of claim 3 where said receiver receives said second plurality of bits and, in response to a user input, said receiver receives said additional bits.

6. The apparatus of claim 3 where said receiver first receives said second plurality of bits and, in response to a user input, said receiver requests transmission of said additional bits.

7. Apparatus comprising:
a receiver for receiving a GTCQ-encoded signal which comprises a plurality of bits that represent the encoding of a frame of signal samples, where said plurality of bits is divisible into at least a first subset of bits and a second subset of bits; and
a trellis-code-quantization decoder, responsive to said first subset of bits, for developing a decoded approximation of said frame of signal samples, where said trellis-code-quantization decoder is controllable (a) to develop a first decoded approximation of said frame of signal samples in response to said plurality of bits to develop, or (b) to develop a second decoded approximation of said frame of signal samples in response to said first subset of bits.

8. The apparatus of claim 7 where said first plurality of bits is divisible into at least a first subset of bits, a second subset of bits, and a third subset of bits, and where said trellis-code-quantization decoder is controllable
to develop a first decoded approximation of said frame of signal samples in response to said second subset of bits to develop, or
to develop a second decoded approximation of said frame of signal samples in response to said second subset of bits and said first subset of bits, or
to develop a third decoded approximation of said frame of signal samples in response to said plurality of bits.

9. Encoding apparatus comprising:
a memory; and
a processor, interacting with said memory, that implements a trellis quantizer which develops a plurality of encoded-output bits for each encoded sample in a frame of samples, such that
when said plurality of encoded-output bits for each encoded sample are applied to a trellis decoder, the decoder develops a first approximation of the frame of samples quantized by said trellis quantizer, and
when a subset of bits of said plurality of encoded-output bits of each sample is applied to a trellis decoder, the decoder develops a second approximation of the frame of samples quantized by said trellis quantizer, where the second approximation is not better than said first approximation.

10. The trellis quantizer of claim 9 where said plurality of encoded-output bits for each encoded sample is such that:
when only a first bit in said plurality of encoded-output bits for each encoded sample is applied to a trellis decoder, the decoder develops a first approximation of the frame of samples quantized by said trellis quantizer, and
when only the first bit and a second bit in said plurality of encoded-output bits for each encoded sample is applied to a trellis decoder, the decoder develops a second approximation of the frame of samples quantized by said trellis quantizer.

11. The trellis quantizer of claim 10 where said plurality of encoded-output bits for each encoded sample is such that:
when only the first bit and the second bit and a third bit in said plurality of encoded-output bits for each encoded sample is applied to a trellis decoder, the decoder develops a third approximation of the frame of samples quantized by said trellis quantizer.

12. The trellis quantizer of claim 9 further comprising a channel interface that outputs said plurality of encoded-output bits onto a transmission channel.

13. The trellis quantizer of claim 12 where
said channel interface outputs said subset of bits of said plurality of encoded-output bits of each sample onto a first sub-channel, and outputs the remainder of said plurality of encoded-output bits for each encoded sample onto a second sub-channel.

14. The trellis quantizer of claim 12 where
said channel interface outputs said subset of bits of said plurality of encoded-output bits of each sample onto said transmission channel and, thereafter, outputs the remainder of said plurality of encoded-output bits for each encoded sample onto said transmission channel.

15. The trellis quantizer of claim 12 where
said channel interface outputs said subset of bits of said plurality of encoded-output bits of each sample onto said transmission channel and, in response to a request, outputs the remainder of said plurality of encoded-output bits for each encoded sample onto said transmission channel.

16. Encoding apparatus comprising:
a memory; and
a processor, interacting with said memory, and implementing a trellis encoder that is responsive to an incoming frame of signal samples, developing thereby a plurality of sets of encoded output bits, where
each of the sets corresponds to one of said signal samples,
each of the sets is divisible into at least a first subset and a second subset, forming thereby a plurality of first subsets and a plurality of second subsets,
said plurality of sets is sufficient to enable a trellis decoder to develop a first approximation of said incoming frame of signal samples, and
said plurality of first subsets is sufficient to enable a trellis decoder to develop a second approximation of said incoming frame of samples.

17. Apparatus comprising:
a memory; and
a trellis encoder that includes a processor which employs a trellis graph for encoding each sample in a train of samples, where the trellis graph is decomposable into a first-level trellis graph having state transitions made up of second-level trellis graphs.

18. Apparatus comprising:
a memory; and
a processor that employs a plurality of second-level trellis graphs interconnected such that each of the second-level trellis graphs constitutes a transition in a first-level trellis graph.

19. The apparatus of claim 17 where the first-level trellis graph and the second-level trellis graph have the same structure.

20. The apparatus of claim 17 where said first-level trellis graph and said second-level trellis graph are each four-state trellis graphs.

21. The apparatus of claim 17 where each transition in the second-level trellis graph is replaced with a third-level trellis graph.

22. Apparatus comprising:
a memory; and a trellis encoder that employs a J-level trellis graph for encoding each sample in a train of samples, where the J-level trellis graph can be decomposed into J successive trellis graph levels, where each transition in an $i^{th}$-level trellis graph is replaced with a $(i+1)^{th}$ trellis graph, with i=1, 2, 3, . . . J, and where the trellis encoder develops J sets of bits for each sample that is quantized by the quantizer.

23. The trellis encoder of claim 22 where the $i^{th}$ set of bits from said J set of bits includes all bits belonging the sets j, where j<i.

24. A method for developing quantization thresholds $c_i^j$ for a trellis encoder employing a J-level trellis graph for encoding each sample in a frame of samples, where the J-level trellis graph can be decomposed into J successive trellis graph levels, where each transition in a $j^{th}$-level trellis graph is replaced with a $(j+1)^{th}$ trellis graph, with j=1, 2, 3, . . . J, where the trellis encoder develops J sets of bits for each sample that is quantized by the encoder, and where the superscript j in said $c_i^j$ designates a level in said J-level trellis graph, and the subscript i in said $c_i^{\ j}$ designates the different codevector in level j, the method comprising the steps of:

obtaining a training sequence x(n), selecting codevectors $c_i^j$, setting an index m=1, and setting a distortion measure C to 0;

encoding said training sequence based on codevectors $c_i^j$ to develop a coded signal;

ascertaining sets $B_i^j$, where $B_i^j$ for a given j and i corresponds to all training samples which are encoded as $c_i^j$;

decoding said coded signal to develop an approximation signal $\tilde{x}(n)$;

developing a distortion measure by evaluating $$\overline{D}^{(m)} = \frac{1}{L} \sum_{j=1}^{J} p(j) \sum_{n=1}^{L} |x(n) - \tilde{x}_j(n)|^2,$$

where p(j) is a probability distribution of a level j being used by a user in decoding signals quantized by said trellis encoder, L is the number of samples in said frame, and $\tilde{x}_j(n)$ corresponds to a j-level approximation of said samples in said frame;

developing an improvement measure $$\frac{\overline{D}^{(m-1)} - \overline{D}^{(m)}}{\overline{D}^{(m)}};$$

comparing said improvement measure to a selected threshold, when said step of comparing determines that said improvement measure is greater than said selected threshold, replacing said quantization thresholds $c_i^j$ with $\tilde{c}_i^j$, where $$\tilde{c}_i^j = \frac{1}{|B_i^j|^2} \sum_{x(n) \in B_i^j} x(n);$$

incrementing index m after said step of replacing, and returning control to said step of encoding; and terminating said method when said step of comparing determines that said improvement measure determines that said improvement measure is not greater than said selected threshold.

* * * * *